Dec. 21, 1937.  C. H. HELLYAR  2,102,952
BEARING
Filed April 9, 1935
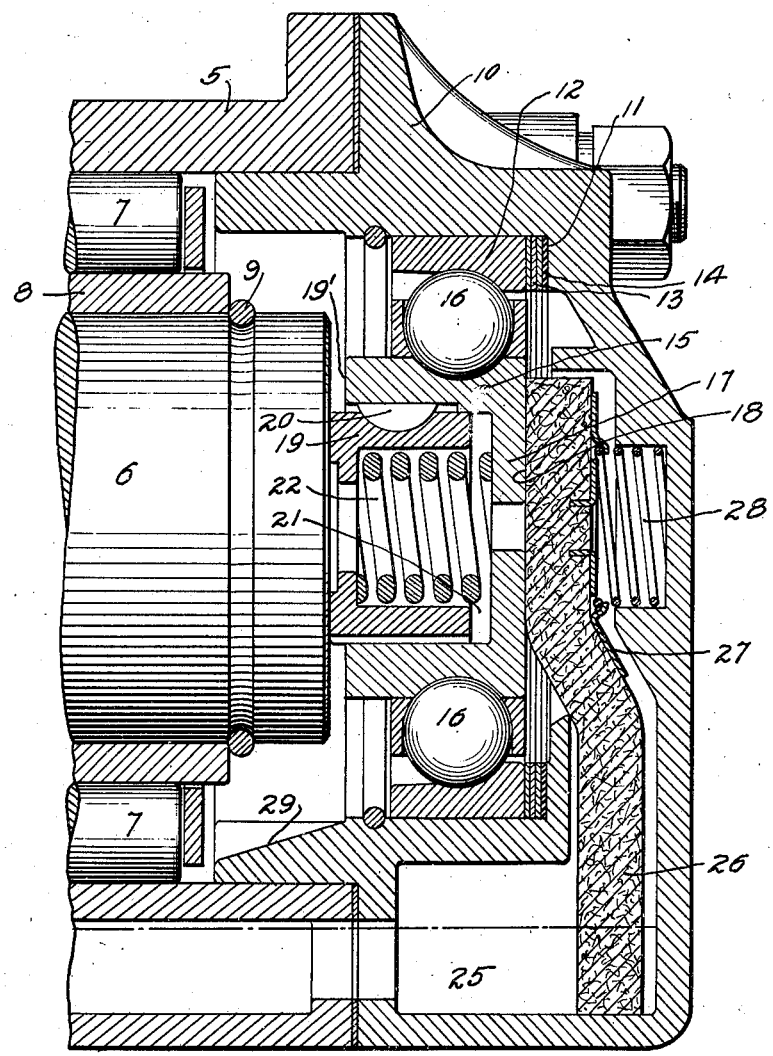
INVENTOR
Charles H. Hellyar
BY
Mitchell Bahret
ATTORNEYS Patented Dec. 21, 1937

2,102,952

UNITED STATES PATENT OFFICE 2,102,952

BEARING

Charles Henry Hellyar, New Britain, Conn., assignor to The Fafnir Bearing Company, New Britain, Conn., a corporation of Connecticut Application April 9, 1935, Serial No. 15,418

18 Claims. (Cl. 308—187)

My invention relates to a bearing and more particularly to a thrust bearing for car axles, shafts for heavy rolls, and the like. Car axles and, in general, shafts for some particular applications are capable during normal operation of axial movement and during such axial movements quite severe end thrusts must be absorbed.

It is the general object of my invention to provide an improved form of anti-friction thrust bearing for car axles and shafts in general which are subject to considerable axial motion during operation.

It is a more specific object to provide a thrust bearing of the character indicated, which is relatively simple in construction, easy to assemble, and which is not likely to get out of order.

It is a further object to provide an improved lubricating means for a thrust bearing and in general lubricating means for a bearing which may be a roller bearing for a car axle.

It is a further object to provide a thrust bearing for a car axle or the like, together with improved means for constantly driving one bearing ring of the thrust bearing by the car axle or other shaft.

Other objects will be either hereinafter pointed out or will become apparent to those skilled in the art.

The drawing, which shows for illustrative purposes only a preferred form of the invention, is a fragmentary, vertical, central sectional view of a railway journal box which illustrates the invention.

In said drawing, 5 indicates a journal box which, in the preferred form shown, is a journal box of a railway car. The axle or shaft 6 is journaled in the box on an anti-friction bearing, preferably of the cylindrical roller type employing rollers 7—7 interposed between the box and a bearing sleeve 8 held on the axle 6 against movement in one direction by means such as a snap ring 9. The shaft 6 during normal operation intermittently moves axially in the box 5 and during such movement the rollers 7—7 slide relatively to either the sleeve 8 or the bearing surface within the housing 5. My invention relates particularly to an improved form of thrust bearing for the shaft or axle 6.

In the preferred form shown, the thrust bearing is carried in the cover 10, bolted or otherwise secured to the housing proper 5. The thrust bearing itself preferably comprises a radial type angular contact ball bearing, though certain features of the invention are in no wise limited to a ball bearing nor to an angular contact type of ball bearing. The cover 10 may be counterbored as at 11, to provide a bore or support for the outer ring 12 of the angular contact bearing. The ring 12 may be spaced from the bottom of the counterbore and adjusted therein by means such as gaskets 13, one of which, designated 14, is of rubber or other resilient material so as to assist in taking the shocks incident to the axial movement of the shaft 6. The thrust bearing in the form shown is a unit handling bearing including the outer ring 12 and inner ring 15 and interposed balls 16—16 holding the rings or raceway members together. The inner ring in the preferred form is generally cup-shaped, that is, has a generally radially extending portion 17 providing a generally radially extending surface 18 spaced from the adjacent end wall of the cover 10 for a purpose to be later described. The opposite end of the inner ring is extended, as indicated at 19', and the end of the shaft 6 is adapted to abut the end 19' of the inner ring. When such shaft moves axially toward the right, the thrust of the shaft 6 is taken through the inner ring, angularly through the balls, the outer ring 12, and gaskets and cover. It is often desirable and in some cases it may be necessary to initiate the rotation of the inner ring before the maximum thrust of the axle or shaft 6 is transmitted thereto. I have therefore provided means for constantly maintaining the inner ring 15 in rotation by means of the shaft 6.

It will be noted that with the unit handling thrust bearing as illustrated, the bearing is substantially fixed in an axial direction, though of course it might float slightly. In order to maintain the bearing in rotation, I preferably provide what may be termed a driving member 19, which forms a yielding thrust block carried by the thrust bearing and keyed as at 20 or otherwise prevented from rotation in the recess 21 of the inner ring. A spring 22 interposed between the bottom of the cup ring 15 and a part of the driving member 19 serves to constantly maintain the driving member in contact with the end of the shaft 6 during all normal positions of axial movement thereof so that rotation of the shaft will always be transmitted through the driving member 19 to the inner ring 15 and the latter will at all times be rotating substantially at the speed of the shaft 6. When the shaft 6 moves axially toward the right, the presence of the yielding thrust block 19 prevents undue shock on the several parts of the thrust bearing and cushions the blow when the shaft reaches the extreme limit of thrust movement in said direction.

In most cases it will be desirable to also employ the resilient gasket 14, though such gasket in some cases will not be necessary. It may be here noted that the fit of the ring 12 within the counterbore 11 is not a tight fit and if there be irregularities in the shaft end tending to unduly twist the thrust bearing, the relatively loose fit of the ring 12 in its counterbore will permit sufficient orientation of the ring 12 in its seat so as to cause self-alignment of the thrust bearing.

I have provided, in addition to the thrust bearing, improved lubricating means for such thrust bearing, as well as for the main roller bearing. In the form shown, the housing 5 and cover are provided with an oil reservoir 25 and a wick 26 dips into the oil reservoir and extends upwardly into the space outside the radial portion 17 of the inner ring 15 and into engagement with the face 18. The wick may be backed up by a sheet metal plate 27 and urged into contact with the face 18 by means such as a spring 28. Oil will be sucked up in the wick 26 and upon rotation of the inner ring 15 oil will be carried from the wick centrifugally outwardly along the face 18 and be thus discharged. The oil discharged or slung off will splatter and tend to lubricate the parts of the thrust bearing and the oil running down on the relatively fixed parts will pass toward the left through the thrust bearing and down the incline 29 and into the raceway for the radial load carrying rollers 7 and be carried by the rollers entirely around the housing. The oil after passing to the left of the main bearing may drop down and be returned to the reservoir 25 through the passage, as shown.

All parts of the thrust bearing and the lubricating means are all conveniently carried by the cover so that when the cover is removed the shaft 6 is exposed and all thrust bearing parts are in position for easy inspection or repair. The bearing is relatively simple in construction and is a serviceable anti-friction thrust bearing for a railway car axle or the like. The method of lubrication is excellent for bearings when oil is used in that a small amount of oil is supplied during rotation of the bearing and, as the bearing speeds up, there is a tendency for the lubrication to increase. If the wick lubrication method shown be omitted the inner ring could of course be a more or less conventional inner ring of a radial bearing.

While the invention has been described in considerable detail and a single preferred form shown as applied to a railway car axle, it is to be understood that various changes and modifications may be made within the scope of the invention as defined in the appended claims.

I claim:

1. In a device of the character indicated, a bearing box, a bearing for taking radial load, an axially movable shaft journaled therein, a separate unit handling thrust bearing comprising inner and outer concentric raceway rings with interposed anti-friction bearing members, the outer ring being supported by said box, and a member forming a sliding driving connection between the other of said raceway rings and said shaft, whereby said shaft will drive the inner ring of said thrust bearing in all axial positions of said shaft, means to supply oil to said inner ring to be slung by the latter to lubricate said bearing.

2. In a device of the character indicated, a bearing box, a radial bearing, an axially movable shaft journaled therein, a separate thrust bearing for said shaft including inner and outer bearing rings with interposed anti-friction bearing members, means for resiliently receiving the end thrust of one of said bearing rings in said housing, and a yielding connection carried by the other of said bearing rings and engaging the end of said shaft, whereby the latter will be caused to rotate with said shaft.

3. In a device of the character indicated, a bearing box, a bearing therein for taking radial load, an axially movable shaft journaled therein, a thrust bearing for said shaft including inner and outer bearing rings with interposed anti-friction bearing members, means for yieldingly supporting said outer bearing ring to permit slight oscillation thereof, and means carried by the inner ring for maintaining a thrust connection at all times with said shaft.

4. In a device of the character indicated, a bearing box including a bearing box cover, an axially movable shaft journalled for radial support in said box, said cover being provided with a counterbore, a thrust bearing comprising an outer bearing ring mounted in said counterbore, a resilient backing between the bottom of said counterbore and one end of said outer ring, an inner bearing ring, anti-friction bearing members interposed between said bearing rings, and a driving connection between said bearing ring and said shaft, for the purpose described.

5. In a device of the character indicated, a bearing box, an axially movable shaft journaled therein, a thrust bearing for said shaft comprising opposed raceway members with interposed anti-friction bearing members, one of said raceway members being recessed, and a driving member located in said recess and engageable with said shaft in all axial positions thereof, and a spring interposed between said recessed member and said driving member for maintaining contact between the latter and said shaft in all positions of axial movement thereof.

6. In a device of the character indicated, a bearing box, a roller bearing therein, a shaft journaled in said roller bearing and movable axially in said box, said bearing box including a cover, an angular contact bearing mounted in said cover and including inner and outer bearing rings, with interposed anti-friction bearing members, said shaft being engageable with said inner bearing ring in one extreme of its axial movement, and means for driving said inner ring by said shaft in other positions of axial movement of said shaft.

7. In a device of the character indicated, a bearing box, an axially movable shaft journaled therein for radial support, a thrust bearing therefor including inner and outer bearing rings, means for non-rotatably supporting the outer ring, a driving connection between said shaft and the other of said rings, said latter ring having an extended generally radial surface at its outer end and spaced from said box, an oil reservoir and a wick extending from said oil reservoir into said space and into engagement with said generally radial surface, for the purpose described.

8. In a device of the character indicated, a bearing box including a cover, an axially movable shaft journaled for radial load in said box, a thrust bearing for said shaft comprising a unit handling bearing mounted in said cover and comprising inner and outer raceway rings, said cover having a counterbore for receiving the outer ring of said thrust bearing and providing a space at the outer end of the inner ring, a driving member interposed between the inner ring of said thrust bearing and the end of said shaft, whereby said inner ring will be driven by said shaft whether or not said shaft is in contact with the ring itself, said cover having an oil reservoir therein and a wick extending from said reservoir into said space and into engagement with the outer end of said inner bearing ring, for the purpose described.

9. In a device of the character indicated, a bearing box including a cover, an axially movable shaft journaled for radial load therein, a thrust bearing including opposed raceway members with interposed anti-friction bearing members, one of said raceway members having a generally radially extending surface at its outer end spaced from the inner wall of said cover, a lubricant reservoir and wick extending up from said reservoir into said space and into engagement with said generally radially extending surface, for the purpose described.

10. In a device of the character indicated, a bearing box including an end cover, an axially movable shaft journaled for radial load in said box, said cover having a shouldered thrust bearing shoulder facing toward the end of said shaft, an angular contact bearing constituting a thrust bearing for said shaft and including inner and outer bearing rings with interposed anti-friction bearings members, and resilient means on said shoulder to receive and cushion the thrust of the outer ring, the end of said shaft being engageable upon extreme axial movement in one direction with the opposite end of said inner bearing ring, for the purpose described.

11. In a bearing of the character described, a box, a bearing therein for taking radial loads, an axially movable shaft journaled therein, a separate thrust bearing at the end of said shaft comprising an outer ring, a concentric ring within the same and spaced therefrom, anti-friction bearings in the space between said rings, a thrust block mounted for reciprocation in the inner ring and projecting partially therefrom at one end thereof to engage the end of the shaft in different axial positions of the latter, with means for resiliently urging said block toward and against said shaft to maintain driving engagement therewith for rotating the inner ring.

12. In a device of the character indicated, a bearing box, an axially movable shaft in said box, anti-friction bearing means for rotatably supporting said shaft radially in said box, a cover cap for said box, and having a bore to receive a thrust bearing, a thrust bearing carried by said cover cap and comprising a radial type angular contact bearing having inner and outer bearing rings with interposed anti-friction bearing members holding said rings in assembled relation, said outer ring being mounted in said bore in said cover, and said inner ring being normally spaced from the end of said shaft but engageable by the latter upon axial movement thereof in one direction, whereby end thrusts of said shaft in said one direction will be transmitted by said inner ring and angularly through said anti-friction bearing members to said outer bearing ring and cover cap carrying the same.

13. In a device of the character indicated, bearing box means, an axially movable shaft in said box means, anti-friction bearing means for rotatably supporting said shaft radially in said box means, a separate thrust bearing carried in the outer end of said box adjacent the end of said shaft and comprising a radial type angular contact bearing having inner and outer bearing rings with interposed anti-friction bearing members holding said rings in assembled relation, one of said rings being mounted in the outer end of said box means and the other of said rings being normally spaced from but engageable by said shaft upon axial movement of the latter in one direction, whereby end thrusts of said shaft will be transmitted by said rings and anti-friction bearing members to the end of said box means.

14. In a device of the character indicated, bearing box means, shaft means rotatably carried thereby, said box and shaft means being movable relatively to each other in a direction axially of said shaft means, a thrust bearing in the outer end of said bearing box adjacent the end of said shaft for taking only end thrusts of said shaft means and comprising a radial type angular contact bearing having inner and outer bearing rings with interposed anti-friction bearing members holding said rings in assembled relation, one of said bearing rings being carried by one of said means, the other of said means having a thrust surface normally free of said other bearing ring but intermittently engageable thereby upon relative axial movements of said box and shaft means, for the purpose described.

15. In a device of the character indicated, bearing box means, shaft means rotatably carried thereby, said box and shaft means being movable relatively to each other in a direction axially of said shaft means, a thrust bearing for taking end thrusts of said shaft means including opposed bearing rings with interposed anti-friction bearing members, said thrust bearing as a unit being mounted for movement relatively to both said shaft and box means in a direction axially of said shaft means, said shaft and box means having opposed thrust surfaces for cooperation with said opposed bearing rings, for the purpose described.

16. In a device of the character indicated, bearing box means, shaft means rotatably carried thereby, said box and shaft means being movable relatively to each other in a direction axially of said shaft means, a thrust bearing for taking end thrusts of said shaft means and including a radial type angular contact bearing having inner and outer bearing rings with interposed anti-friction bearing members, one of said bearing rings being relatively loosely mounted in said box means to permit slight self alignment thereof, resilient gasket means between said box means and bearing ring mounted therein, said shaft means having a thrust abutment surface for cooperation with the other of said bearing rings for the purpose described.

17. In a device of the character indicated, bearing box means, axially movable rotatable shaft means therein, anti-friction bearing means for supporting said shaft means radially in said box means, a separate thrust bearing for taking end thrusts of said shaft means and including a radial type angular contact bearing having inner and outer bearing rings with interposed anti-friction bearing members, one of said rings being slidably mounted in said box means at the end thereof, the other of said rings being engageable with the end of said shaft, resilient means interposed between the end of said box means and said ring carried thereby, whereby the thrusts transmitted by said shaft to said box means through said bearing rings and anti-friction bearing members will be cushioned.

18. In a device of the character indicated, a bearing box, an end cover therefor, an axially movable shaft in said box and extending to a point adjacent said cover, cylindrical rollers interposed between said box and shaft for rotatably supporting the latter radially therein, a thrust bearing between the end of said shaft and said cover and comprising a radial type angular contact bearing having inner and outer bearing rings with bearing balls interposed therebetween and holding said bearing rings in assembled relation, said cover having a counterbore therein, said outer bearing ring being mounted and secured in said counterbore, said inner ring being thereby held in normally spaced relation to the adjacent end of said shaft and intermittently engageable by the latter during axial movement thereof in one direction, said cover cap and assembled thrust bearing being removable from said box as a unit.

CHARLES HENRY HELLYAR.